United States Patent
Lu et al.

(10) Patent No.: US 10,289,901 B2
(45) Date of Patent: May 14, 2019

(54) GESTURE CONTROL DEVICE AND METHOD

(71) Applicant: HON HAI PRECISION INDUSTRY CO., LTD., New Taipei (TW)

(72) Inventors: Chih-Te Lu, New Taipei (TW); Chin-Pin Kuo, New Taipei (TW); Tung-Tso Tsai, New Taipei (TW); Jung-Hao Yang, New Taipei (TW); Chih-Yuan Chuang, New Taipei (TW); Tsung-Yuan Tu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 16 days.

(21) Appl. No.: 15/604,666

(22) Filed: May 25, 2017

(65) Prior Publication Data

US 2017/0344813 A1    Nov. 30, 2017

(30) Foreign Application Priority Data

May 27, 2016    (TW) .............................. 105116709 A

(51) Int. Cl.
| | |
|---|---|
| G06K 9/00 | (2006.01) |
| G06K 9/52 | (2006.01) |
| G06K 9/78 | (2006.01) |
| G06F 3/01 | (2006.01) |
| G06F 3/03 | (2006.01) |

(52) U.S. Cl.
CPC ......... *G06K 9/00335* (2013.01); *G06F 3/017* (2013.01); *G06F 3/0304* (2013.01); *G06K 9/00201* (2013.01); *G06K 9/52* (2013.01); *G06K 9/78* (2013.01)

(58) Field of Classification Search
None
See application file for complete search history.

(56) References Cited

U.S. PATENT DOCUMENTS 9,477,302 B2 * 10/2016 Kauffmann ........... H04L 12/282
9,784,554 B2 * 10/2017 Gray ..................... B23Q 17/22
(Continued)

OTHER PUBLICATIONS

Caon, Maurizio, Yong Yue, Julien Tscherrig, Elena Mugellini, and O. Abou Khaled. "Context-aware 3d gesture interaction based on multiple kinects." In Proceedings of the first international conference on ambient computing, applications, services and technologies, AMBIENT, pp. 7-12. 2011. (Year: 2011).*

(Continued)

*Primary Examiner* — Michelle M Entezari
(74) *Attorney, Agent, or Firm* — ScienBiziP, P.C.

(57) ABSTRACT

A device for recognizing control gestures and determining which one device out of a plurality is the target of control acquires images of a gesture from each electronic device. A three dimensional coordinate system for each image is established, and coordinate of a central point of each electronic device determined. Extent of gesture to the left and to the right at different depths is determined and a regression plane equation is calculated. A distance between the regression plane and center points of each electronic device is determined and the electronic device with the closest (the shortest distance) center point is determined as the target device of the control gesture. A gesture control method is also provided.

8 Claims, 4 Drawing Sheets

(56) References Cited

U.S. PATENT DOCUMENTS

| | | | | |
|---|---|---|---|---|
| 2007/0259716 | A1* | 11/2007 | Mattice | G06F 3/013 463/36 |
| 2012/0113241 | A1 | 5/2012 | Sairam et al. | |
| 2015/0199122 | A1* | 7/2015 | Garmark | H04L 67/42 715/716 |
| 2016/0224036 | A1* | 8/2016 | Baker | G05D 23/1393 |
| 2016/0321838 | A1* | 11/2016 | Barone | H04N 1/00827 |
| 2017/0277267 | A1* | 9/2017 | Liu | G06F 3/011 |

OTHER PUBLICATIONS

Zhen-Zhang Li, Yuan-Xiang Zhang, Zhi-Heng Li; A Fingertip Detection and Interaction System Based on Stereo Vision; http://cvl.ice.cycu.edu.tw/publications/Li2011.pdf; 2011; pp. 2-9, Form 1; Taiwan.

\* cited by examiner

US 10,289,901 B2

GESTURE CONTROL DEVICE AND METHOD

CROSS-REFERENCE TO RELATED APPLICATIONS

This application claims priority to Taiwan Patent Application No. 105116709 filed on May 27, 2016.

FIELD

The subject matter herein generally relates to interface devices, and particularly to a gesture control device and method capable of determining an object to be controlled by gesture, among a plurality of electronic devices.

BACKGROUND

Electronic devices can be controlled by gestures. A gesture command usually controls one electronic device. However, a number of electronic devices may be close together, and it is difficult to determine which one of the electronic devices should be controlled by the gesture.

BRIEF DESCRIPTION OF THE DRAWINGS

Implementations of the present technology will now be described, by way of example only, with reference to the attached figures.

DETAILED DESCRIPTION

Figure 1:
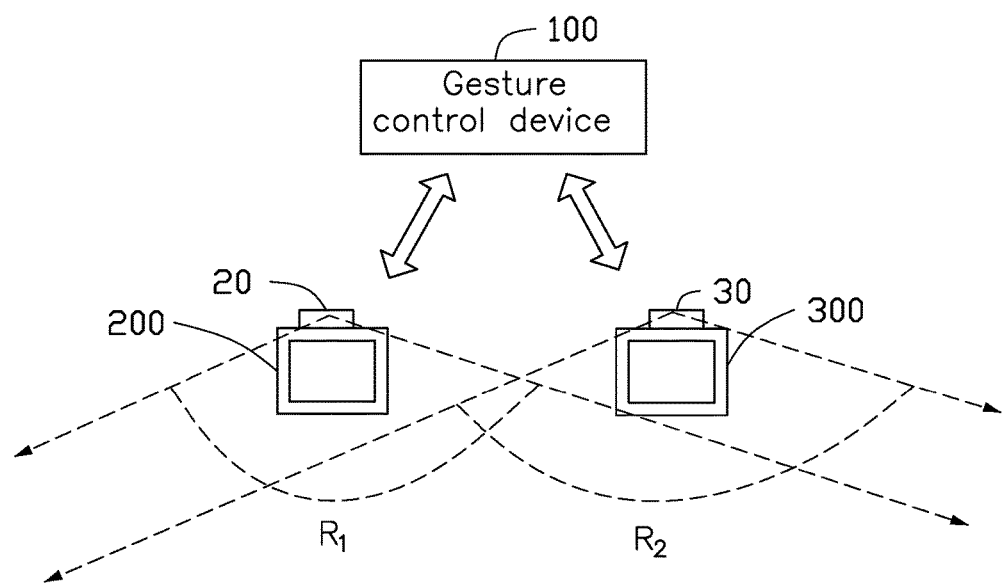
FIG. 1 is a block diagram illustrating an exemplary embodiment of an operating environment of a device with system for control by gesture.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The term "comprising" means "including, but not necessarily limited to", it specifically indicates open-ended inclusion or membership in a so-described combination, group, series, and the like.

FIG. 1 illustrate an exemplary embodiment of an operating environment of a gesture control device 100. The gesture control device 100 can communicate with a number of electronic devices. The gesture control device 100 can determine which one of the electronic devices should be controlled by a gesture. In the exemplary embodiment, the electronic devices can be, but are not limited to, televisions, air conditioners, fridges, multimedia players, monitors, computers, and the like. The gesture control device 100 can communicate with the electronic devices wirelessly, for example by using WIFI, Global System for Mobile Communications (GSM), General Packet Radio Service (GPRS), Code Division Multiple Access (CDMAW-CDMA), CDMA2000, IMT Single Carrier, Enhanced Data Rates for GSM Evolution (EDGE), Long-Term Evolution, (LTE), Time-Division LTE, (TD-LTE), High Performance Radio Local Area Network, (HiperLAN), High Performance Radio Wide Area Network, (HiperWAN), Local Multipoint Distribution Service, (LMDS), Worldwide Interoperability for Microwave Access, (WiMAX), ZIGBEE, BLUETOOTH, Flash Orthogonal Frequency-Division Multiplexing, (Flash-OFDM), High Capacity Spatial Division Multiple Access, (HC-SDMA), Universal Mobile Telecommunications System, (UMTS), UMTS Time-Division Duplexing, (UMTS-TDD), Evolved High Speed Packet Access, (HSPA+), Time Division Synchronous Code Division Multiple Access, (TD-SCDMA), Evolution-Data Optimized, (EV-DO), Digital Enhanced Cordless Telecommunications, (DECT), or the like. The gesture control device 100 also can communicate with electronic devices by wires.

In the exemplary embodiment, a first electronic device 200 and a second electronic device 300 are taken as examples of communicating with the gesture control device 100. In the exemplary embodiment, the first electronic device 200 includes a first image capturing device 20, the second electronic device 300 includes a second image capturing device 30. The first image capturing device 20 is a depth camera configured to capture images of gestures in a first effective range R1, the second image capturing device 30 is a depth camera configured to capture gesture images in a second effective range R2. The first electronic device 200 and the second electronic device 300 can execute functions according to gestures captured by the image capturing devices 20 and/or 30.

In the exemplary embodiment, the gesture control device 100 can be, but is not limited to, a server, a communication device such as a Set Top Box, or an integrated chip or programming modules embedded in the first electronic device 200 or in the second electronic device 300.

Figure 2:
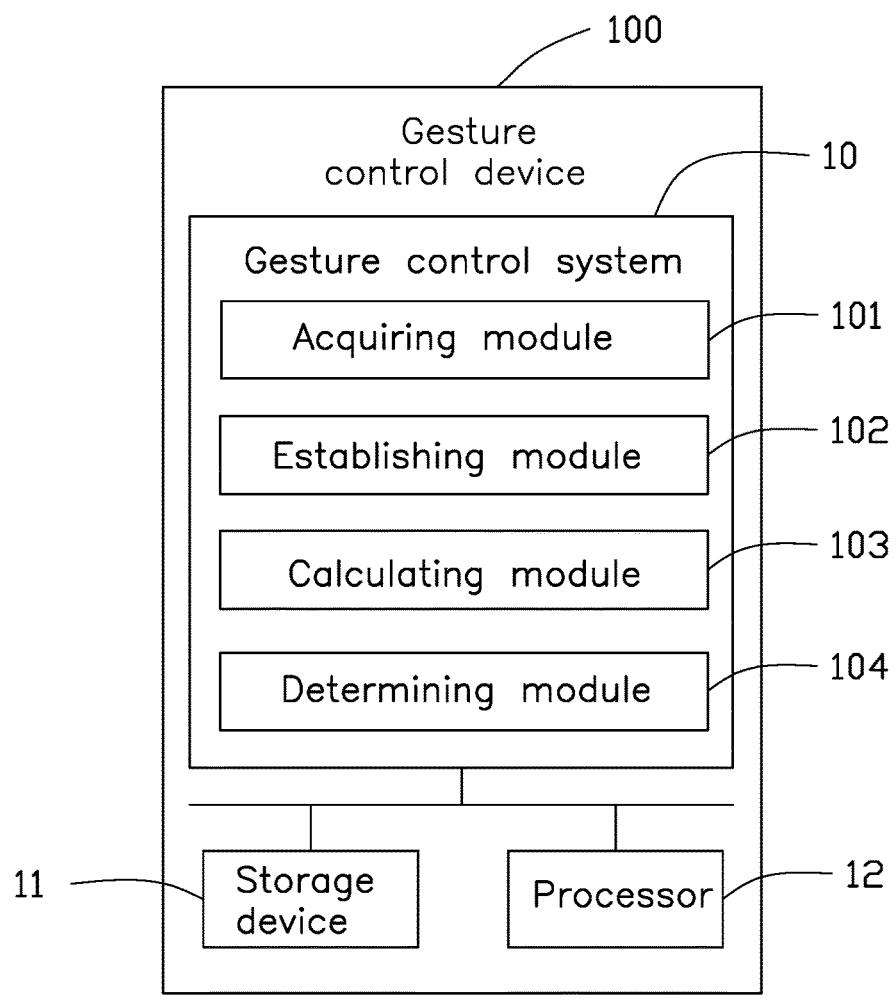
FIG. 2 is a block diagram illustrating an exemplary embodiment of a gesture control system running in the device of FIG. 1.

Referring to FIG. 2, in the exemplary embodiment, the gesture control device 100 can include, but is not limited to, a storage device 11 and a processor 12. The storage device 11 can be, but is not limited to, an internal storage system, such as a flash memory, a random access memory (RAM) for temporary storage of information, and/or a read-only memory (ROM) for permanent storage of information. The storage device 11 can also be a storage system, such as a hard disk, a storage card, or a data storage medium. The processor 12 can be, but is not limited to, a central processing unit, a digital signal processor, or a single chip, for example.

In the exemplary embodiment, the storage device 11 can store a gesture control system 10. The gesture control system 10 can include a number of modules, which are collections of software instructions stored in the storage device 11 and executed by the processor 12. In the exemplary embodiment, the gesture control system 10 can include an acquiring module 101, an establishing module 102, a calculating module 103, and a determining module 104.

The acquiring module 101 acquires an image of a gesture from each of the first image capturing device 20 and/or the second image capturing device 30 and acquires an orientation of a gesture in the gesture image. In the exemplary embodiment, the gesture image can include a depth information as to objects in the images. In the exemplary embodiment, the gesture image can include a number of pictures, thus the orientation and motion in the gesture can be acquired according to a position of the gesture in different pictures. The orientation of the gesture can indicate that the gesture of a user has a directivity. The orientation is determined as ended if the gesture is stopped for a preset time interval. In the exemplary embodiment, the first image capturing device 20 and the second image capturing device 30 capture the gesture image when a gesture is detected in the effective area of the first image capturing device 20 and the second image capturing device 30.

The establishing module 102 establishes a three dimensional coordinate system for the gesture image, and determines a coordinate of a central point of each of the electronic devices (the first electronic device 200 and the second electronic device 300). In the exemplary embodiment, plane coordinates of the gesture image are determined as an X axis and a Y axis of the coordinate system, and the depth direction of the gesture image is determined as a Z axis of the coordinate system. In the exemplary embodiment, the coordinate of the center points of the electronic devices are predetermined according to a position of the image capturing device. For example, if the first electronic device 200 is a computer, and the image capturing device 20 is located in the middle of an upper edge of a screen of the first electronic device 200, the coordinate of the center point of the first electronic device 200 will be predetermined as the coordinate of the center point of the screen of the first electronic device 200.

Figure 3:
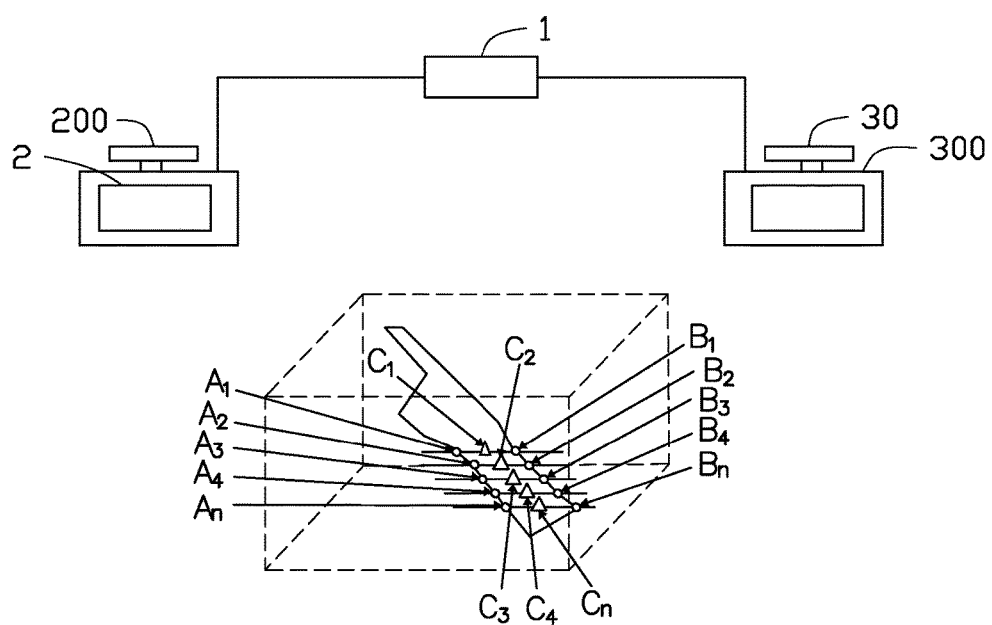
FIG. 3 is a schematic diagram illustrating an exemplary embodiment of a working process of the device of FIG. 1.

The acquiring module 101 further determines a coordinate of a most extreme left-side horizontal position (left end) of the gesture in different depths and a coordinate of a most extreme right-side horizontal position (right end) of the gesture in different depths when the gesture is ended. For example, as shown in FIG. 3, a coordinate of a left end $A_1$ of the gesture in a depth $Z_1$ is $(x'_1, y'_1, z_1)$, a coordinate of a right end $B_1$ of the gesture in the depth $Z_1$ is $(x''_1, y''_1, z_1)$, a coordinate of the left end $A_2$ of the gesture in a depth $Z_2$ is $(x'_2, y'_2, z_2)$, a coordinate of the right end $B_2$ of the gesture depth $Z_2$ is $(x''_2, y''_2, z_2)$. Thus a coordinate of the left end $A_n$ of the gesture in a depth $Z_n$ is $(x'_n, y'_n, z_n)$, and a coordinate of the right end $B_n$ of the gesture depth $Z_n$ is $(x''_n, y''_n, z_n)$.

The calculating module 103 calculates a coordinate of a center point between the left end and the right end of the gesture in each different depth. For example, a coordinate of a center point $C_1$ in the depth $Z_1$ is $$\left(\frac{x'_1 + x''_1}{2}, \frac{y'_1 + y''_1}{2}, z_1\right),$$

a coordinate of a center point $C_2$ in the depth $Z_2$ is $$\left(\frac{x'_2 + x''_2}{2}, \frac{y'_2 + y''_2}{2}, z_2\right),$$

and a coordinate of a center point $C_n$ in the depth $Z_n$ is $$\left(\frac{x'_n + x''_n}{2}, \frac{y'_n + y''_n}{2}, z_n\right).$$

The calculating module 103 calculates a regression plane equation according to the coordinate of the center points of the gesture image in different depths.

In the exemplary embodiment, the calculating module 103 calculates the regression plane equation by using a regression analysis method. By standardizing the coordinate of the center points, the calculating module 103 obtains the following formulas:

$$x'_k = \frac{x_k - \bar{x}}{S_x}, \; y'_k = \frac{y_k - \bar{y}}{S_y}, \; z'_k = \frac{z_k - \bar{z}}{S_z}, \text{ wherein,}$$

$$\bar{x} = \frac{x_1 + x_2 + \ldots + x_n}{n}, \; S_x = \sqrt{\frac{\sum_{i=1}^{n}(x_i - \bar{x})^2}{n-1}}, \; \bar{y} = \frac{y_1 + y_2 + \ldots + y_n}{n},$$

$$S_y = \sqrt{\frac{\sum_{i=1}^{n}(y_i - \bar{y})^2}{n-1}}, \; \bar{z} = \frac{z_1 + z_2 + \ldots + z_n}{n}, \; S_z = \sqrt{\frac{\sum_{i=1}^{n}(z_i - \bar{z})^2}{n-1}}.$$

Setting a standardized plane equation as $z'=ax'+by'+c$, a residual error is $e_i = z'_i - \hat{z}'_i$, and is the result. The calculating module 103 further calculates a value of "a", "b", and "c" in above formula when a value of $$\sum_{i=1}^{n} e_i^2$$

is minimal.

$$\sum_{i=1}^{n} e_i^2 = \sum_{i=1}^{n}(ax'_i + by'_i + c - z'_i)^2 = \sum_{i=1}^{n}[(ax'_i + by'_i - z'_i) + c]^2$$

$$= \sum_{i=1}^{n}(ax'_i + by'_i - z'_i)^2 + 2c\sum_{i=1}^{n}(ax'_i + by'_i - z'_i) + \sum_{i=1}^{n}c^2$$

$$= \sum_{i=1}^{n}(ax'_i + by'_i - z'_i)^2 + 2ac\sum_{i=1}^{n}x'_i + 2bc\sum_{i=1}^{n}y'_i - 2c\sum_{i=1}^{n}z'_i + nc^2$$

$$= \sum_{i=1}^{n}(ax'_i + by'_i - z'_i)^2 + nc^2,$$

here, $\bar{x}' = 0 \Leftrightarrow \sum_{i=1}^{n} x'_i = 0, \; \bar{y}' = 0 \Leftrightarrow \sum_{i=1}^{n} y'_i = 0, \; \bar{z}' = 0 \Leftrightarrow \sum_{i=1}^{n} z'_i = 0.$ If C=0, above formula becomes:

$$\sum_{i=1}^{n}(ax'_i + by'_i - z'_i)^2 = \left(\sum_{i=1}^{n} x'^2_i\right)a^2 + \left(2\sum_{i=1}^{n} x'_i y'_i\right)ab +$$

$$\left(\sum_{i=1}^{n} y'^2_i\right)b^2 - 2\left(\sum_{i=1}^{n} x'_i z'_i\right)a - 2\left(\sum_{i=1}^{n} y'_i z'_i\right)b + \sum_{i=1}^{n} z'^2_i.$$

By $$f(a,b) = \left(\sum_{i=1}^{n} x_i'^2\right)a^2 + \left(2\sum_{i=1}^{n} x_i' y_i'\right)ab + \left(\sum_{i=1}^{n} y_i'^2\right)b^2 - 2\left(\sum_{i=1}^{n} x_i' z_i'\right)a - 2\left(\sum_{i=1}^{n} y_i' z_i'\right)b$$

referring to a function $$+ \sum_{i=1}^{n} z_i'^2,$$

that is: $f(a,b) = Aa^2 + 2Bab + Cb^2 + Da + Eb + F$.

By using a Cauchy inequality algorithm:

$$\left(\sum_{i=1}^{n} x_i'^2\right)\left(\sum_{i=1}^{n} y_i'^2\right) \geq \left(\sum_{i=1}^{n} x_i' y_i'\right)^2 \Rightarrow B^2 - AC \leq 0.$$

Generally speaking, $B^2 - AC \neq 0$.

According to a formula: if $f(x,y) = ax^2 + 2bxy + cy^2 + dx + ey + f$, here $a > 0$, and $b^2 - ac \leq 0$, $f(x,y)$ is minimal when $(x,y) = (h, k)$. In this condition, $$h = \frac{\begin{vmatrix} -d & 2b \\ -e & 2c \end{vmatrix}}{\begin{vmatrix} 2a & 2b \\ 2b & 2c \end{vmatrix}} = \frac{-dc + de}{2(ac - b^2)}, k = \frac{\begin{vmatrix} 2a & -d \\ 2b & -e \end{vmatrix}}{\begin{vmatrix} 2a & 2b \\ 2b & 2c \end{vmatrix}} = \frac{-ae + bd}{2(ac - b^2)}.$$

Calculating the function $f(a,b) = Aa^2 + 2Bab + Cb^2 + Da + Eb + F$, $$a = \frac{\begin{vmatrix} -D & 2B \\ -E & 2C \end{vmatrix}}{\begin{vmatrix} 2A & 2B \\ 2B & 2C \end{vmatrix}} = \frac{-DC + DE}{2(AC - B^2)}, b = \frac{\begin{vmatrix} 2A & -D \\ 2B & -E \end{vmatrix}}{\begin{vmatrix} 2A & 2B \\ 2B & 2C \end{vmatrix}} = \frac{-AE + BD}{2(AC - B^2)}. \text{ Here,}$$

$$A = \sum_{i=1}^{n} x_i'^2, B = \sum_{i=1}^{n} x_i' y_i', C = \sum_{i=1}^{n} y_i'^2,$$

$$D = \sum_{i=1}^{n} x_i' z_i', E = \sum_{i=1}^{n} y_i' z_i', F = \sum_{i=1}^{n} z_i'^2.$$

The parameters "a" and "b" in above formula further can be converted to $$a = \frac{-DC + DE}{2(AC - B^2)} =$$

$$\frac{-\left(\sum_{i=1}^{n} x_i' z_i'\right)\left(\sum_{i=1}^{n} y_i'^2\right) + \left(\sum_{i=1}^{n} x_i' z_i'\right)\left(\sum_{i=1}^{n} y_i' z_i'\right)}{2\left[\left(\sum_{i=1}^{n} x_i'^2\right)\left(\sum_{i=1}^{n} y_i'^2\right) - \left(\sum_{i=1}^{n} x_i' y_i'\right)^2\right]} = \frac{-r_{xz}r_{yy} + r_{xz}r_{yz}}{2(r_{xx}r_{yy} - r_{xy}^2)},$$

$$b = \frac{-AE + BD}{2(AC - B^2)} = \frac{-\left(\sum_{i=1}^{n} x_i'^2\right)\left(\sum_{i=1}^{n} y_i' z_i'\right) + \left(\sum_{i=1}^{n} x_i' y_i'\right)\left(\sum_{i=1}^{n} x_i' z_i'\right)}{2\left[\left(\sum_{i=1}^{n} x_i'^2\right)\left(\sum_{i=1}^{n} y_i'^2\right) - \left(\sum_{i=1}^{n} x_i' y_i'\right)^2\right]} =$$

$$\frac{-r_{xx}r_{yz} + r_{xy}r_{xz}}{2(r_{xx}r_{yy} - r_{xy}^2)}.$$

The calculated regression plane equation is:

$$\frac{z - \bar{z}}{S_z} = a\left(\frac{x - \bar{x}}{S_x}\right) + b\left(\frac{y - \bar{y}}{S_y}\right).$$

The calculating module 103 further calculates a distance between the regression plane and the center points of each of the electronic devices (the first electronic device 200 and the second electronic device 300). For example, if the coordinate of the center point of the first electronic device 200 is $(x_0, y_0, z_0)$, and if the regression plane equation is expanded to form $px + qy + rz + s = 0$, the calculating module 103 calculates the distance between the center point of the first electronic device 100 and the regression plane according to the formula:

$$\frac{px_0 + qy_0 + rz_0 + s}{\sqrt{p^2 + q^2 + r^2}}.$$

The determining module 104 determines which one of the electronic devices (for example the first electronic device 200 or the second electronic device 300) is intended as the target of the gesture by determining which one of the distances between the regression plane and the center points of the electronic devices is less than a preset value. If the determining module 104 determines that a distance between the regression plane and the center point of one electronic device is less than the preset value, the determining module determines that such electronic device is the object to be controlled by the gesture. If the determining module 104 determines that a distance between the regression plane and the center point of the electronic device is equal to or greater than the preset value, the determining module determines that such electronic device is not the intended target object to be controlled.

Figure 4:
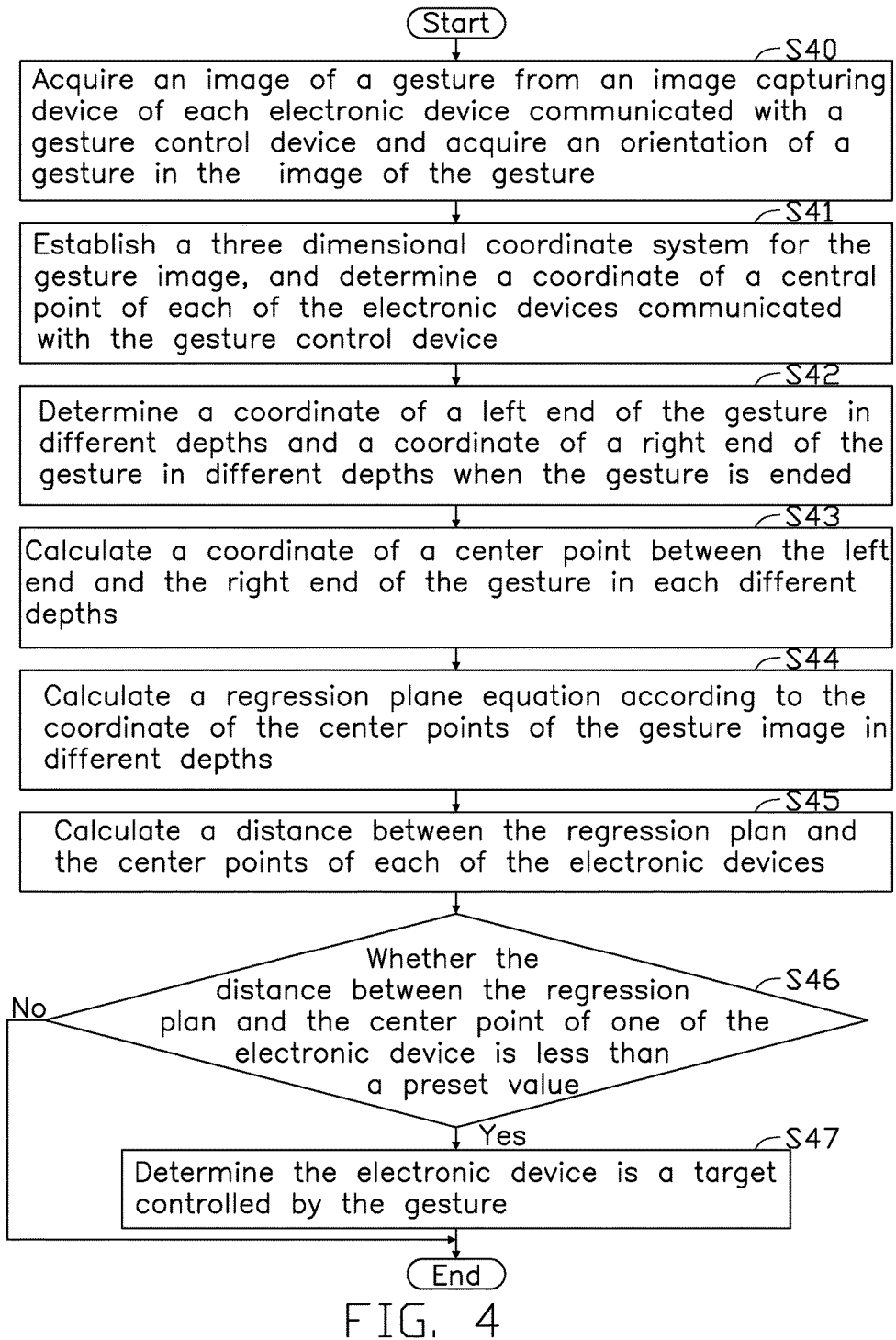
FIG. 4 is a flowchart illustrating an exemplary embodiment of a gesture control method.

A method for determining a target electronic device controlled by a gesture is illustrated in FIG. 4. The method is provided by way of example, as there are a variety of ways to carry out the method. Each block shown in FIG. 4 represent one or more processes, methods, or subroutines carried out in the example method. Additionally, the illustrated order of blocks is by example only and the order of the blocks can be changed. The example method can begin at block S40.

At block S40, an acquiring module of a gesture control device acquires an image of a gesture from an image capturing device of each electronic device communicated with the gesture control device, and acquires an orientation of a gesture in the image of the gesture. In the exemplary embodiment, the gesture image can include a depth information. The gesture image can include a number of pictures, the orientation and motion in the gesture is acquired according to a position of the gesture in different pictures. The orientation of the gesture can indicate that the gesture of a user has a directivity. The orientation is determined as ended if the gesture is stopped for a preset time interval.

At block S41, a establishing module establishes a three dimensional coordinate system for the gesture image, and determines a coordinate of a central point of each of the electronic devices communicated with the gesture control device. In the exemplary embodiment, the coordinate of the center point of the electronic devices are predetermined according to a position of the image capturing device.

At block S42, the acquiring module determines a coordinate of a most extreme left-side horizontal position (left end) of the gesture in different depths and a coordinate of a most extreme right-side horizontal position (right end) of the gesture in different depths when the gesture is ended. For example, as shown in FIG. 3, a coordinate of a left end $A_1$ of the gesture in a depth $Z_1$ is $(x'_1, y'_1, z_1)$, a coordinate of a right end $B_1$ of the gesture in the depth $Z_1$ is $(x''_1, y''_1, z_1)$, a coordinate of the left end $A_2$ of the gesture in a depth $Z_2$ is $(x'_2, y'_2, z_2)$, a coordinate of the right end $B_2$ of the gesture depth $Z_2$ is $(x''_2, y''_2, z_2)$. Thus, a coordinate of the left end $A_n$ of the gesture in a depth $Z_n$ is $(x'_n, y'_n, z_n)$, and a coordinate of the right end $B_n$ of the gesture depth $Z_n$ is $(x''_n, y''_n, z_n)$.

At block S43, the calculating module calculates a coordinate of a center point between the left end and the right end of the gesture in each different depth.

At block S44, the calculating module calculates a regression plane equation according to the coordinate of the center points of the gesture image in different depths. The method for calculating the regression plane equation is described previously.

At block S45, the calculating module calculates a distance between the regression plane and the center points of each of the electronic devices. The method for calculating the distance is described previously.

At block S46, the determining module determines whether the distance between the regression plane and the center point of one of the electronic device is less than a preset value. If the determining module determines that the distance between the regression plane and the center point of one of the electronic device is less than the preset value, the procedure goes to block S47. Otherwise, the procedure is ended.

At block S47, the determining module determines that the electronic device is a target controlled by the gesture if the distance between the regression plane and the center point of this electronic device is less than the preset value.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the present disclosure.

What is claimed is:

1. A gesture control device to communicate with at least two electronic devices, each of the electronic devices comprising an image capturing device, the gesture control device comprising:
    at least one processor; and
    at least one storage device storing one or more programs, when executed by the at least one processor, the one or more programs cause the at least one processor to:
        acquire an image of a gesture from the image capturing device of each electronic device communicated with the gesture control device and acquire an orientation of a gesture in the image of the gesture;
        establish a three dimensional coordinate system for the gesture image, and determine a coordinate of a central point of each of the electronic devices communicated with the gesture control device;
        determine a coordinate of a left end of the gesture in different depths and a coordinate of a right end of the gesture in different depths when the gesture is ended;
        calculate a coordinate of a center point between the left end and the right end of the gesture in each different depths;
        calculate a regression plane equation according to the coordinate of the center points of the gesture image in different depths;
        calculate a distance between the regression plane and the central points of each of the electronic devices; and
        determine which one of the electronic devices is intended as a target controlled by the gesture by determining which one of the distances between the regression plane and the central point of the electronic device is less than a preset value.

2. The gesture control device of claim 1, wherein the gesture image comprises a plurality of pictures, the orientation of the gesture is acquired according to a position of the gesture in different pictures.

3. The gesture control device of claim 1, wherein the orientation is determined as ended if the gesture is stopped for a preset time interval.

4. The gesture control device of claim 1, wherein a formula for calculating the distance between the regression plane and the center point of the electronic device is:

$$\frac{px_0 + qy_0 + rz_0 + s}{\sqrt{p^2 + q^2 + r^2}},$$

wherein $(x_0, y_0, z_0)$ is the coordinate of the center point of the electronic device, the regression plane equation is: $px+qy+rz+s=0$.

5. A gesture control method applied in a gesture control device, the gesture control device configured to communicate with at least two electronic devices, each of the electronic devices comprising an image capturing device, the gesture control method comprising:
    acquiring a gesture image from the image capturing device of each electronic device communicated with the gesture control device and acquiring an orientation of a gesture in the gesture image;
    establishing a three dimensional coordinate system for the gesture image, and determining a coordinate of a central point of each of the electronic devices communicated with the gesture control device;
    determining a coordinate of a left end of the gesture in different depths and a coordinate of a right end of the gesture in different depths when the gesture is ended;
    calculating a regression plane equation according to the coordinate of the center points of the gesture image in different depths;
    calculating a distance between the regression plane and the central points of each of the electronic devices; and
    determining which one of the electronic devices is intended as a target controlled by the gesture by determining which one of the distances between the regression plane and the central point of the electronic device is less than a preset value.

6. The gesture control method of claim 5, wherein the gesture image comprises a plurality of pictures, the orientation of the gesture is acquired according to a position of the gesture in different pictures.

7. The gesture control method of claim 5, wherein the orientation is determined as ended if the gesture is stopped for a preset time interval.

8. The gesture control method of claim 5, wherein a formula for calculating the distance between the regression plane and the center point of the electronic device is:

$$\frac{px_0 + qy_0 + rz_0 + s}{\sqrt{p^2 + q^2 + r^2}},$$

wherein $(x_0, y_0, z_0)$ is the coordinate of the center point of the electronic device, the regression plane equation is: $px+qy+rz+s=0$.

* * * * *